United States Patent [19]
Weiss

[11] Patent Number: 5,921,866
[45] Date of Patent: Jul. 13, 1999

[54] ELASTIC COUPLING WITH AXIAL AND ANGULAR MOVEMENT

[75] Inventor: Rudolf Weiss, Vreen, Germany

[73] Assignee: ATEC-Weiss GmbH & Co., Vreden, Germany

[21] Appl. No.: 08/838,498

[22] Filed: Apr. 7, 1997

[30] Foreign Application Priority Data

Apr. 11, 1996 [DE] Germany .......................... 196 14 267

[51] Int. Cl.⁶ .................................................. F16D 3/56
[52] U.S. Cl. ............................................... 464/85; 464/93
[58] Field of Search .................. 464/81, 85, 87, 464/93, 98, 99, 403

[56] References Cited

U.S. PATENT DOCUMENTS

| | | |
|---|---|---|
| 2,181,183 | 11/1939 | Guy . |
| 2,308,881 | 1/1943 | Jencick ...................... 464/85 |
| 2,457,507 | 12/1948 | Strachovsky ............... 464/85 |
| 2,593,877 | 8/1952 | Hagenlocher .............. 464/93 |
| 2,745,267 | 5/1956 | Hagenlocher .............. 464/93 |
| 2,846,856 | 8/1958 | Hagenlocher .............. 464/93 |
| 2,846,857 | 8/1958 | Hagenlocher .............. 464/93 |
| 4,092,837 | 6/1978 | Gebauer et al. ........... 464/85 |
| 4,416,645 | 11/1983 | Fredericks ................. 464/81 |
| 5,324,234 | 6/1994 | Kuribayashi ............... 464/81 |
| 5,541,038 | 5/1996 | Harpin ....................... 464/93 |

FOREIGN PATENT DOCUMENTS

| | | | |
|---|---|---|---|
| 2113357 | 10/1971 | Germany ................. | 464/93 |
| 43 12 518 A1 | 10/1994 | Germany . | |
| 43 15 861 A1 | 11/1994 | Germany . | |
| 5-346124 | 12/1993 | Japan ....................... | 464/81 |
| 447027 | 5/1936 | United Kingdom . | |
| 524749 | 8/1940 | United Kingdom ..... | 464/85 |

*Primary Examiner*—Eileen Dunn Lillis
*Attorney, Agent, or Firm*—Proskauer Rose LLP

[57] ABSTRACT

An elastic coupling with axial and angular movement for connecting two rotating machine parts (3, 4), comprises at least one elastic coupling part (2, 2') and at least one torsionally-rigid all-steel coupling part (1). Hitherto known couplings of this type, have the disadvantage that their elastic coupling elements are also expected to compensate for angular and/or radial offset, which leads to excessive loads. By contrast, the coupling according to the invention provides for the elastic coupling part (2) on the one machine part (3) being torsionable, and in relation to the latter's axis of rotation, radially rigidly-guided, while the torsionally-rigid coupling part (1) is connected to the elastic coupling part (2) and the other machine part (4) in a way that allows axial and angular movement in each case.

5 Claims, 4 Drawing Sheets

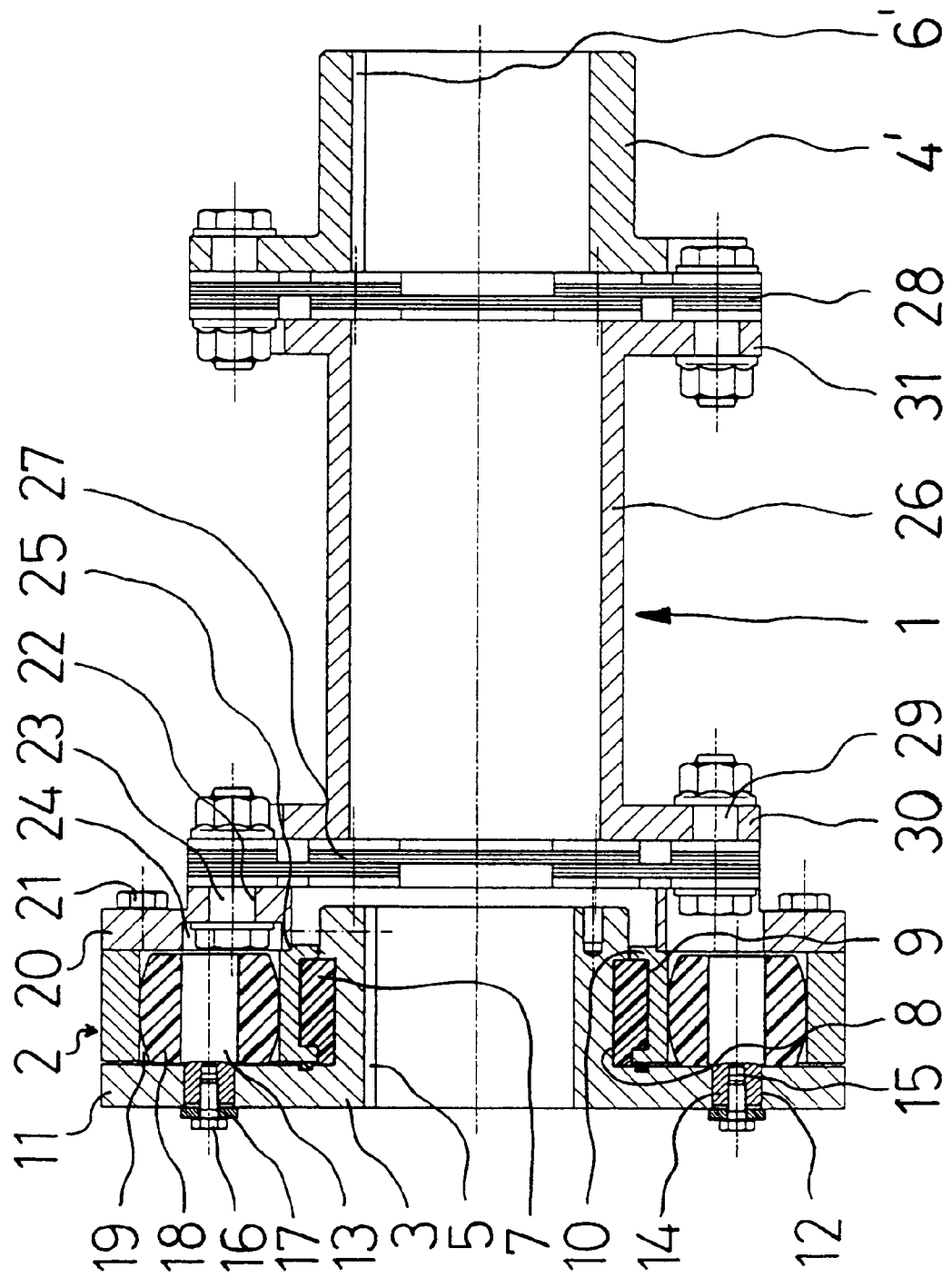

ELASTIC COUPLING WITH AXIAL AND ANGULAR MOVEMENT

FIELD OF THE INVENTION

The present invention relates to an elastic coupling with axial and angular movement for connecting two rotating machine parts, comprising at least one elastic coupling part and at least one torsionally-rigid all-steel coupling part.

BACKGROUND OF THE INVENTION

Couplings of this type, being a combination of an all-steel coupling and an elastic coupling, are basically known.

For example, DE 43 12 518 A1 discloses a shaft-coupling for torque transmission between two rotatable connectors, which comprises a flexible diaphragm disk connected to a coupling disk on the other connector, by way of rubber bushes distributed at the circumference arranged on an axially parallel driving pin. In this, the driving pins are held at the diaphragm disk or the coupling disk axially-slidable in such a way that the circumferential margin of the diaphragm disk is axially movable in relation to the coupling disk.

This known coupling however, like other hitherto known couplings of this type, have the disadvantage that the elastic coupling part is expected to compensate in particular for radial offset, and if necessary also for angular offset of the rotatable machine parts to be connected. This leads however to excessive loads on the elastic coupling elements resulting in relatively quick wear.

The taking up of radial, angular and axial offsets by the elastic coupling part can also lead to strong reaction forces, because the elastomers which are predominantly used in previously known elastic couplings due to their being maintenance free, are relatively rigid when subjected to pressure load.

It is the object of the present invention to create an elastic coupling with axial and angular movement, of the type mentioned above, which compensates for axial, radial and angular offset of the connected rotatable machine parts without thereby placing additional stress on the elastic coupling elements. The elastic coupling elements are to have the sole task of reducing torque jolts and cushioning torsional oscillation.

SUMMARY OF THE INVENTION

According to the invention, this object is solved by the elastic coupling part on the one machine part being torsionable, and radially rigidly-guided in relation to its axis of rotation, while the torsionally-rigid part of the coupling is connected to the elastic coupling part and the other machine part in a way that allows axial and angular movement in each case.

Thus there is a division of tasks between the elastic coupling part and the torsionally-rigid coupling part; this division contributes to extending the life of the elastic coupling elements. Furthermore, the solution according to the invention reduces the occurrence of undesirable reaction forces by avoiding a stiffening of the elastic coupling elements caused by the uptake of shaft dislocation.

According to an advantageous embodiment of the solution according to the invention, the elastic coupling part is radially connected to the first machine part by a plastic material. In this way a torsionable and accurate radial guidance of the elastic coupling part on the first machine part can be reliably achieved.

In a further advantageous embodiment, the plastic material forms a bushing which positively engages two grooves, whereby the one groove is located on the first machine part and the other grove is located in a flange of the elastic coupling part. This embodiment ensures that axial shift within the radial guide is largely avoided.

The elasticity of the coupling according to the invention is preferably brought about by elastomer elements. Elastomer elements have the advantage of being maintenance-free.

In order to increase the cushioning effect of the coupling according to the invention, the elastic coupling part can comprise a dual arrangement whereby the torsionally-rigid coupling part is linked to the first machine part by way of a first elastic coupling part, and linked to the second machine part by way of a second elastic coupling part.

According to a further advantageous embodiment, the torsionally-rigid coupling part comprises two multi-plate stack rims which are connected to each other by means of a intermediate sleeve. Such a coupling part is also maintenance-free.

BRIEF DESCRIPTION OF THE INVENTION

Below, the invention is further illustrated by way of examples of embodiments with reference to the attached drawing, as follows:

FIG. 1A shows a longitudinal section of a coupling according to a first embodiment with a double-jointed all-steel coupling as the torsionally-rigid coupling element, and one bolt coupling as the elastic coupling part arranged at the drive side;

FIG. 1B shows a longitudinal section of a coupling according to a second embodiment with a double-jointed all-steel coupling as the torsionally-rigid coupling element, and one bolt coupling as the elastic coupling post arranged at the driven side; and FIG. 1C shows a longitudinal section of a coupling according to a third embodiment with a double-jointed all-steel coupling as the torsionally-rigid coupling element, and two bolt couplings;

FIG. 2 shows a section of the bolt coupling according to FIG. 1B, connected by a hub; and FIG. 3 shows a front view of the hub according to FIG. 2.

DETAILED DESCRIPTION OF THE PREFERRED EMBODIMENTS

Figure 1A:
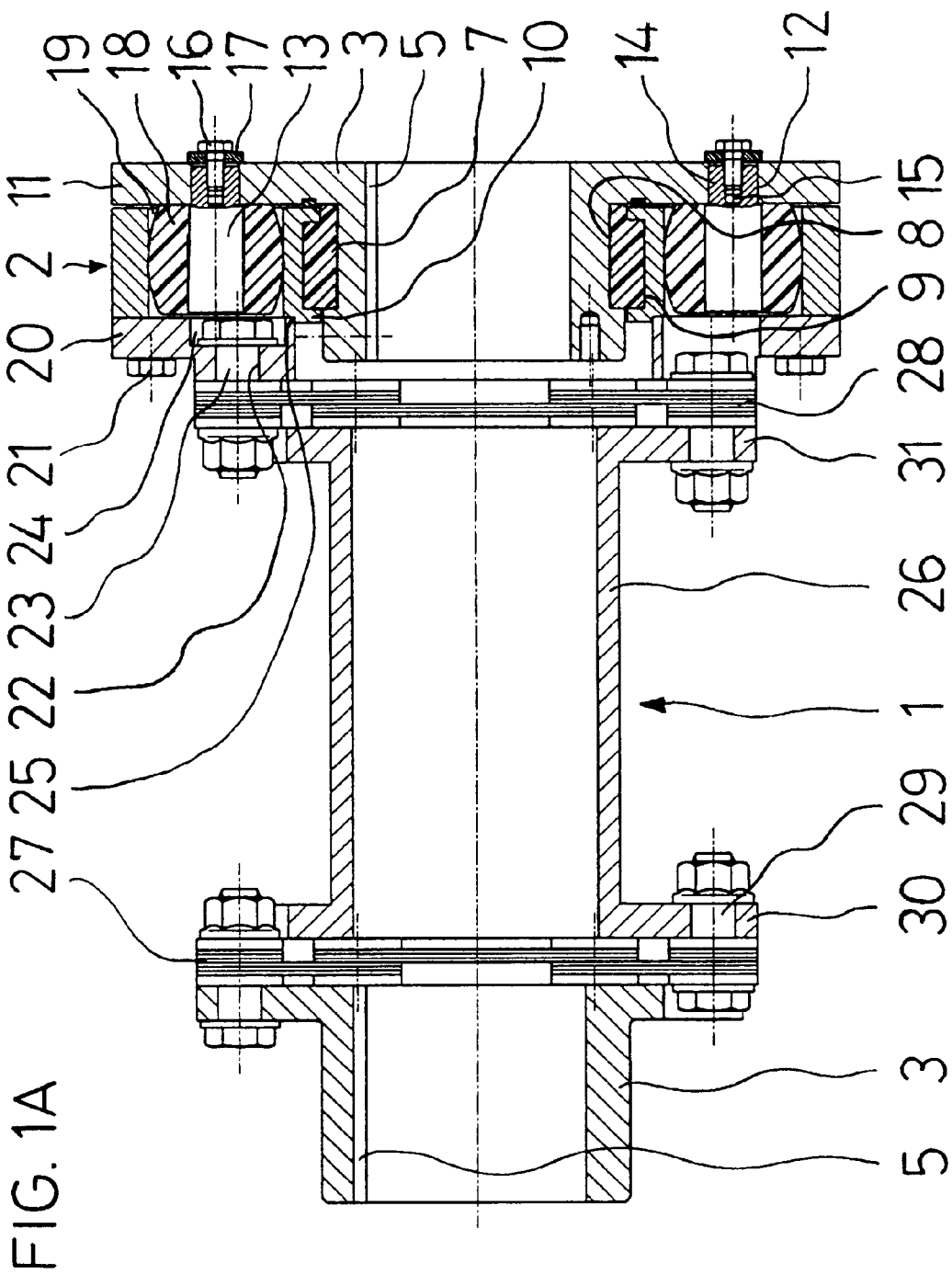
Figure 1C:
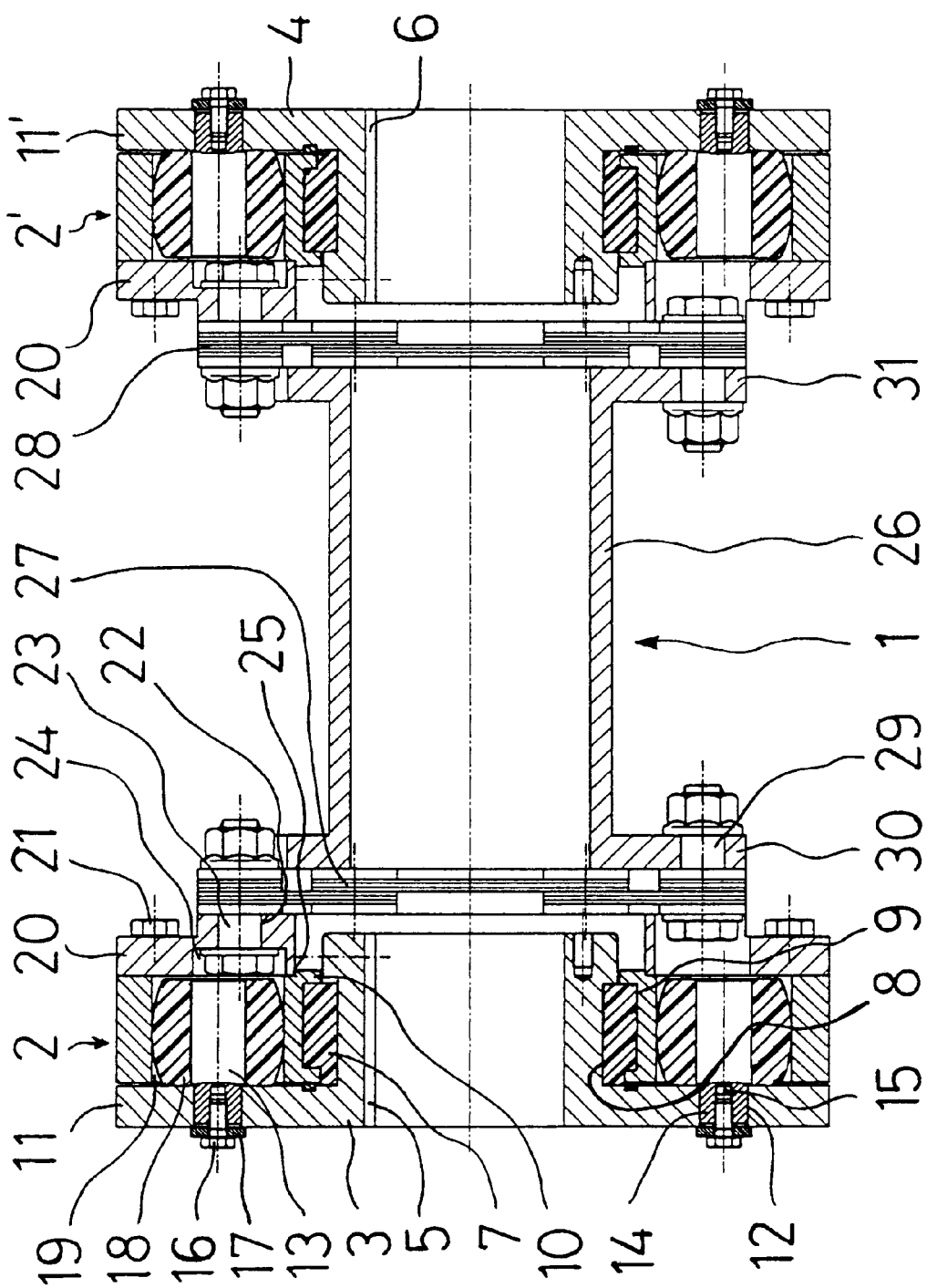
Figure 3:
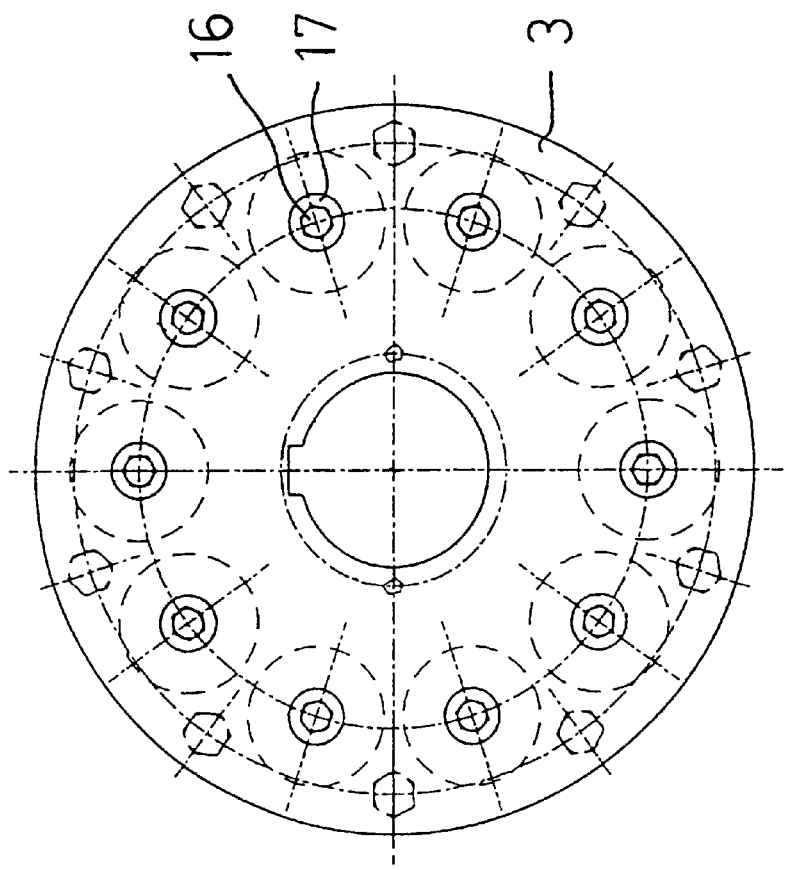

FIGS. 1A, 1B and 1C show three different combinations of a coupling according to the invention, comprising a torsionally-rigid all-steel coupling 1 with axial and angular movement, at least one elastic bolt coupling 2,2' and two hubs 3,3' and 4,4' which comprise a groove 5,5' and 6,6' respectively, and are connectable to a drive shaft or a driven shaft by means of a feather key. The bolt coupling 2, 2' may either be arranged on one side, at the drive or driven side, or on both sides.

In each case the bolt coupling 2 comprises an exact radial guide on the respective hub. For this a plastic material 7 is used which has a relatively low cohesive resistance and which rotatably guides the elastic bolt coupling 2 on the hub 3 or 4 respectively, The plastic material 7 forms a bushing which positively engages annular grooves 8 and 9 which are provided in the hub 3 or in a flange 10 of the bolt coupling 2. Axial shifting of the bolt coupling 2 in respect to the hub 3 is largely prevented by the groove and feather connection. The plastic material 7 may for example, be polyurethane poured into the grooves 8 and 9. Instead of a continuous bushing as a radial guide, segments of such a bushing may be provided.

Furthermore, the hub 3 has a flange 11 which comprises ten bore holes 12 equally spaced on a reference circle. In each of these bore holes a retaining bolt 13 is seated which has a tapered shank 14 with an axial tap 15 and which is fixed to the hub 3 by a screw 16 and a washer 17. Seated on the retaining bolt 13 are cylindrical rubber buffers 18 inserted into the bore holes 19 which are also equally spaced on a reference circle in the flange 10 which is rotatable in respect to the hub 3.

Figure 2:
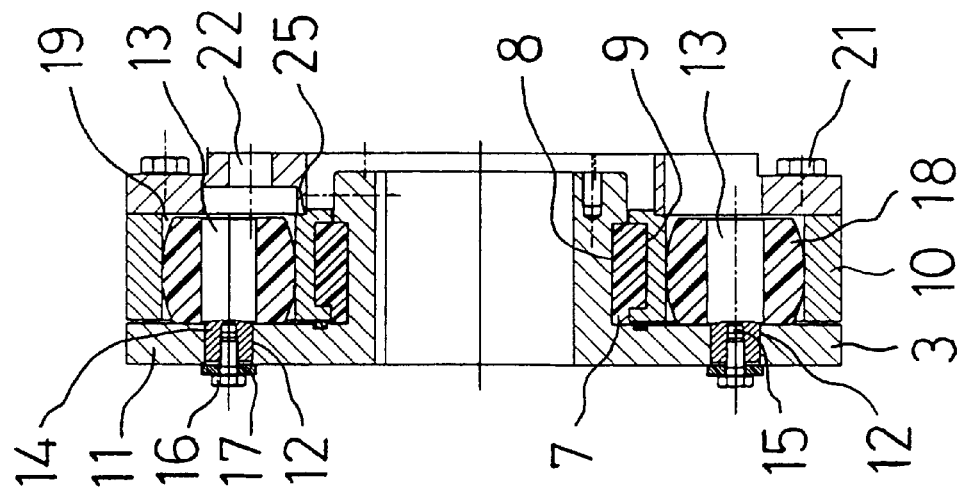

The torsionally-rigid all-steel coupling 1 is attached to the elastic coupling-part 2 by way of a coupling flange 20. The coupling flange 20 comprises bore holes which are arranged on an exterior or interior reference circle. The bore holes located on the exterior hold studs 21 each of which is screwed into the threaded boreholes in the flange 10 of the elastic coupling-part 2. By contrast, the interior bore holes 22 hold studs 23 screwed into a first joint of the torsionally-rigid all-steel coupling-part 1. The heads of those studs 23 are arranged in counter bores 24 of the interior bore holes 22, so that the coupling flange 20 is compactly linked to the flange 10, which runs on elastic bearings, of the bolt coupling 2. In particular FIG. 2 shows that the flange 10 of the bolt coupling has an annular shoulder 25 with a slightly smaller diameter than the interior diameter of the coupling flange 20. By way of this shoulder 25, the coupling flange 20 is centred in respect to the elastic coupling-part 2.

In order to compensate radial offset, the torsionally-rigid coupling-part 1 has two joints which are linked to each other by an intermediate sleeve 26. Each of the joints comprise a multi-plate stack rim 27 or 28, mutually attached to the coupling flanges by studs 23 and 29. Where only one elastic coupling-part 2 is provided, one of the two coupling flanges 30 or 31 of the reduction sleeve 26 is attached by way of a multi-plate stack rim 27 or 28 to a coupling flange of one of the hubs 3' or 4' (see of FIGS. 1A and 1B). By contrast, in the case of a double-sided arrangement, each of the coupling flanges 30 and 31 of the reduction sleeve 26 is connected to the coupling flange 11 or 11' of the respective hub 3 or 4 via a multi-plate stack rim 27 or 28, an intermediate coupling flange 20 or 20' and an elastic coupling-part 2 or 2' (see FIG. 1C).

The invention is not limited to the examples of embodiments described above. But rather, modifications are imaginable which make use of the idea of the invention, even with different design. Thus for example, instead of the rubber buffers 18 shown, similar elastomers exposed to pressure loads may be used.

I claim:

1. An elastic coupling for connecting a first rotatable machine part to a second rotatable machine part, comprising:

an elastic coupling part having a plurality of elastomer elements and being connected to the first rotatable machine part;

a torsionally-rigid coupling part having at least one multi-plate stack rim and being connected to the elastic coupling part and to the second rotatable machine part; and a radial guide for eliminating angular movement of said elastic coupling part in respect to an axis perpendicular to an axis of rotation of said first rotatable machine part;

wherein said guide has at least one plastic element for radially connecting said elastic coupling part to said first rotatable machine part, and wherein said plastic element positively engages first and second grooves provided in said first rotatable machine part and in said elastic coupling part.

2. The elastic coupling according to claim 1, wherein said plastic element forms a bushing that positively engages said grooves.

3. The elastic coupling according to claim 1, wherein said torsionally-rigid coupling part is connected to said second rotatable machine part via a multi-plate stack rim.

4. The elastic coupling according to claim 1, wherein said torsionally-rigid coupling part comprises first and second multi-plate stack rims, said first and second multi-plate stack rims being connected to each other via an intermediate sleeve.

5. The elastic coupling according to claim 1, wherein said torsionally-rigid coupling part is connected to said second rotatable machine part via an elastic coupling part having a plurality of elastomer elements.

* * * * *